(12) United States Patent  
Waldschmidt et al.

(10) Patent No.: US 6,694,765 B1
(45) Date of Patent: Feb. 24, 2004

(54) METHOD AND APPARATUS FOR MOVING AIR THROUGH A HEAT EXCHANGER

(75) Inventors: John E. Waldschmidt, New Market, MN (US); John J. Shaw, Savage, MN (US); David J. VanderWoude, Farmington, MN (US)

(73) Assignee: Thermo King Corporation, Minneapolis, MN (US)

( * ) Notice: Subject to any disclaimer, the term of this patent is extended or adjusted under 35 U.S.C. 154(b) by 0 days.

(21) Appl. No.: 10/208,242

(22) Filed: Jul. 30, 2002

(51) Int. Cl.[7] .......................... F25D 21/00; F25D 21/06
(52) U.S. Cl. ............................................. 62/234; 62/276
(58) Field of Search ........................... 62/234, 276, 82, 62/90, 173, 155, 180, 186

(56) References Cited

U.S. PATENT DOCUMENTS

| | | | |
|---|---|---|---|
| 2,535,364 A | 12/1950 | Lee |
| 2,720,084 A | 10/1955 | Hailey |
| 3,058,317 A | 10/1962 | Putman |
| 3,121,999 A | 2/1964 | Kasbohm et al. |
| 3,159,982 A | 12/1964 | Schachner |
| 3,307,366 A | 3/1967 | Smith |
| 3,314,007 A | 4/1967 | Johnson |
| 3,421,336 A | 1/1969 | Lichtenberger et al. |
| 3,507,128 A | 4/1970 | Murphy et al. |
| 3,552,134 A | 1/1971 | Arenson |
| 3,621,673 A | 11/1971 | Foust |
| 3,662,561 A | 5/1972 | Schroeder |
| 3,667,246 A | 6/1972 | St. Lorant et al. |
| 3,693,370 A | 9/1972 | Miller |
| 3,694,750 A | 9/1972 | Schuhrke |
| 3,712,073 A | 1/1973 | Arenson |
| 3,714,793 A | 2/1973 | Eigenbrod |
| 3,727,423 A | 4/1973 | Nielson |
| 3,740,961 A | 6/1973 | Fischer |
| 3,788,091 A | 1/1974 | Miller |
| 3,802,212 A | 4/1974 | Martin et al. |
| 3,823,568 A | 7/1974 | Bijasiewicz et al. |
| 3,891,925 A | 6/1975 | Dimeff |
| 3,976,458 A | 8/1976 | Krug |
| 3,990,816 A | 11/1976 | Kohler et al. |
| 4,045,972 A | 9/1977 | Tyree, Jr. |
| 4,050,972 A | 9/1977 | Cardinal, Jr. |
| 4,060,400 A | 11/1977 | Williams |
| 4,082,968 A | 4/1978 | Jones |
| 4,100,759 A | 7/1978 | Tyree, Jr. |
| 4,165,618 A | 8/1979 | Tyree, Jr. |

(List continued on next page.)

FOREIGN PATENT DOCUMENTS

FR    2217646    2/1973

OTHER PUBLICATIONS

SB–III CR Fact Sheet; Thermo King Corporation, Dec. 10, 1996.

(List continued on next page.)

Primary Examiner—Marc Norman
(74) Attorney, Agent, or Firm—Michael Best & Friederich LLP

(57) ABSTRACT

A transport temperature control apparatus includes a refrigeration circuit and a heat exchanger having an air inlet and an air outlet in fluid communication with a conditioned space. An evaporator coil extends through the heat exchanger between the inlet and air outlet and is fluidly connected to the refrigeration circuit. A divider defines a first portion of the evaporator coil and a second portion of the evaporator coil. A first fan is housed in the heat exchanger and is adjacent the first portion. The first fan has a first operating condition for directing air across the evaporator coil in a first direction and a first non-operating condition. A second fan is housed in the heat exchanger and is adjacent the second portion. The second fan has a second operating condition for directing air across the evaporator coil in a second direction and a second non-operating condition.

21 Claims, 4 Drawing Sheets

U.S. PATENT DOCUMENTS

| | | |
|---|---|---|
| 4,171,495 A | 10/1979 | McNinch, Jr. |
| 4,186,562 A | 2/1980 | Tyree, Jr. |
| 4,201,191 A | 5/1980 | Zink et al. |
| 4,211,085 A | 7/1980 | Tyree, Jr. |
| 4,224,801 A | 9/1980 | Tyree, Jr. |
| 4,233,817 A | 11/1980 | Toth |
| 4,321,796 A | 3/1982 | Kohno |
| 4,333,318 A | 6/1982 | Tyree, Jr. |
| 4,344,291 A | 8/1982 | Tyree, Jr. et al. |
| 4,348,873 A | 9/1982 | Yamauchi et al. |
| 4,350,027 A | 9/1982 | Tyree, Jr. |
| 4,356,707 A | 11/1982 | Tyree, Jr. et al. |
| 4,406,129 A | 9/1983 | Mills |
| 4,439,721 A | 3/1984 | Mura |
| 4,441,326 A | 4/1984 | Bernauer et al. |
| 4,498,306 A | 2/1985 | Tyree, Jr. |
| 4,543,793 A | 10/1985 | Chellis et al. |
| 4,576,010 A | 3/1986 | Windecker |
| 4,606,198 A | 8/1986 | Latshaw et al. |
| 4,608,830 A | 9/1986 | Peschka |
| 4,626,781 A | 12/1986 | Forkel |
| 4,688,390 A | 8/1987 | Sawyer |
| 4,693,737 A | 9/1987 | Tyree, Jr. |
| 4,695,302 A | 9/1987 | Tyree, Jr. |
| 4,706,468 A | 11/1987 | Howland et al. |
| 4,739,623 A | 4/1988 | Tyree, Jr. et al. |
| 4,748,818 A | 6/1988 | Satterness et al. |
| 4,783,972 A | 11/1988 | Tyree, Jr. et al. |
| 4,856,285 A | 8/1989 | Acharya et al. |
| 4,858,445 A | 8/1989 | Rasovich |
| 4,878,362 A | 11/1989 | Tyree, Jr. |
| 4,888,955 A | 12/1989 | Tyree, Jr. et al. |
| 4,903,495 A | 2/1990 | Howland et al. |
| 4,937,522 A | 6/1990 | Gee |
| 4,940,937 A | 7/1990 | Hattori et al. |
| 4,941,527 A | 7/1990 | Toth et al. |
| 4,986,086 A | 1/1991 | de Langavant |
| 4,995,234 A | 2/1991 | Kooy et al. |
| 5,029,288 A | 7/1991 | Kubota et al. |
| 5,040,374 A | 8/1991 | Micheau |
| 5,056,324 A | 10/1991 | Haley |
| 5,056,991 A | 10/1991 | Peschka et al. |
| 5,069,039 A | 12/1991 | Martin |
| 5,090,209 A | 2/1992 | Martin |
| 5,095,709 A | 3/1992 | Billiot |
| 5,124,602 A | 6/1992 | Nishimura et al. |
| 5,125,237 A | 6/1992 | Saia, III et al. |
| 5,127,230 A | 7/1992 | Neeser et al. |
| 5,147,005 A | 9/1992 | Haeggstrom |
| 5,170,631 A | 12/1992 | Lang et al. |
| 5,172,559 A | 12/1992 | Renken et al. |
| 5,180,004 A | 1/1993 | Nguyen |
| 5,199,275 A | 4/1993 | Martin |
| 5,203,179 A | 4/1993 | Powell |
| 5,209,072 A | 5/1993 | Truckenbrod et al. |
| 5,243,821 A | 9/1993 | Schuck et al. |
| 5,259,198 A | 11/1993 | Viegas et al. |
| 5,267,443 A | 12/1993 | Roehrich et al. |
| 5,267,446 A | 12/1993 | Viegas et al. |
| 5,285,644 A | 2/1994 | Roehrich et al. |
| 5,287,705 A | 2/1994 | Roehrich et al. |
| D345,009 S | 3/1994 | Lewis et al. |
| 5,291,130 A | 3/1994 | Kendzior |
| 5,293,748 A | 3/1994 | Flanigan |
| 5,305,825 A | 4/1994 | Roehrich et al. |
| 5,311,927 A | 5/1994 | Taylor et al. |
| 5,313,787 A | 5/1994 | Martin |
| 5,315,840 A | 5/1994 | Viegas et al. |
| 5,317,874 A | 6/1994 | Penswick et al. |
| 5,320,167 A | 6/1994 | Roehrich et al. |
| 5,333,460 A | 8/1994 | Lewis et al. |
| 5,365,744 A | 11/1994 | Viegas et al. |
| 5,396,777 A | 3/1995 | Martin |
| 5,406,805 A * | 4/1995 | Radermacher et al. ......... 62/81 |
| 5,410,886 A | 5/1995 | Wallace et al. |
| 5,410,890 A | 5/1995 | Arima |
| 5,456,084 A | 10/1995 | Lee |
| 5,458,188 A | 10/1995 | Roehrich et al. |
| 5,477,690 A | 12/1995 | Gram |
| 5,511,955 A | 4/1996 | Brown et al. |
| 5,533,340 A | 7/1996 | Shama et al. |
| 5,557,938 A | 9/1996 | Hanson et al. |
| 5,561,986 A | 10/1996 | Goodall |
| 5,564,277 A | 10/1996 | Martin |
| 5,598,709 A | 2/1997 | Viegas et al. |
| 5,606,870 A | 3/1997 | Lester |
| 5,660,046 A | 8/1997 | de Langavant et al. |
| 5,669,223 A | 9/1997 | Haley et al. |
| 5,694,776 A | 12/1997 | Sahm |
| 5,699,670 A | 12/1997 | Jurewicz et al. |
| 5,701,745 A | 12/1997 | Cheng et al. |
| 5,711,161 A | 1/1998 | Gustafson |
| 5,729,983 A | 3/1998 | Garrett et al. |
| 5,730,216 A | 3/1998 | Viegas et al. |
| 5,775,110 A | 7/1998 | Waldron |
| 5,819,544 A | 10/1998 | Andonian |
| 5,870,897 A | 2/1999 | Barr et al. |
| 5,908,069 A | 6/1999 | Baldwin et al. |
| 5,916,246 A | 6/1999 | Viegas et al. |
| 5,916,253 A | 6/1999 | Amr et al. |
| 5,921,090 A | 7/1999 | Jurewicz et al. |
| 5,947,712 A | 9/1999 | Viegas et al. |
| 5,979,173 A | 11/1999 | Tyree |
| 5,996,472 A | 12/1999 | Nguyen et al. |
| 6,006,525 A | 12/1999 | Tyree, Jr. |
| 6,038,868 A | 3/2000 | Pooley et al. |
| 6,062,030 A | 5/2000 | Viegas |
| 6,076,360 A | 6/2000 | Viegas et al. |
| 6,086,347 A | 7/2000 | Ryska et al. |
| 6,095,427 A | 8/2000 | Hoium et al. |
| 6,106,255 A | 8/2000 | Viegas et al. |
| 6,202,671 B1 | 3/2001 | Horstmann |
| 6,220,048 B1 | 4/2001 | Finan, Sr. et al. |
| 6,276,142 B1 | 8/2001 | Putz |
| 6,286,326 B1 * | 9/2001 | Kopko ....................... 62/179 |

OTHER PUBLICATIONS

SB–III CR Unit, Customer Site Requirements; Automatic Filling Station, Thermo King Corporation, Dec. 10, 1996.

SB–III CR Unit: Refueling Requirements, Thermo King Corporation, Dec. 10, 1996.

SB–III CR Features; Thermo King Corporation, Jan. 22, 1997.

Thermoguard µP–CR Microprocessor Control System Revision 450 × Software TK51262–2–OD (Rev. 1, 06–01), Diagnostic Manual , Copyright 2001—Thermo King Corp.—Minneapolis, MN.

SB–III CR Proof Copy TK51293–X.X, Copyright 2001—Thermo King Corp.—Minneapolis, MN, Dated Nov. 28, 2001.

SB–III CR TK 51309–2–OP (Rev. 07/01), Copyright 2001—Thermo King Corp.—Minneapolis, MN.

Liquid Carbon Dioxide Transport Refrigeration System; Herman Viegas, Thermo King Corporation, 314 West $90^{th}$ Street, Minneapolis, Minnesota USA 55420, Presented at The Seventh CRYOGENICS 2002 IIR International Conference in Prague, Czech Republic, Apr. 23–26, 2002.

* cited by examiner

US 6,694,765 B1

METHOD AND APPARATUS FOR MOVING AIR THROUGH A HEAT EXCHANGER

FIELD OF THE INVENTION

The present invention relates to refrigeration and air-conditioning systems, and more particularly, to a method and an apparatus for controlling the flow of air through a transport temperature control apparatus.

BACKGROUND OF THE INVENTION

Transport temperature control apparatuses are commonly mounted on refrigerated containers, refrigerated straight trucks, refrigerated tractor-trailer combinations, and the like to maintain cargo, such as foods, beverages, plants, flowers, and the like, at a desired set point temperature. In other applications, temperature control apparatuses can be used to condition air in a conditioned space to improve human comfort, such as for example, in buses and passenger trains.

Typically, conventional temperature control apparatuses include a heat exchanger, which extends into the conditioned space. An evaporator coil extends through the heat exchanger and is fluidly connected to a refrigeration circuit. In the refrigeration circuit, a refrigerant, such as for example, a chlorofluorocarbon (CFC) or a cryogen, is cooled, compressed, and/or stored. Liquid refrigerant from the refrigerant cycle is forced into an inlet in the evaporator coil. Warm conditioned space air is then drawn into the heat exchanger through an air inlet and is blown across the evaporator coil by a fan or blower. The relatively warm conditioned space air contacts the relatively cool evaporator coil and is cooled thereby before being forced back into the conditioned space via a discharge in the heat exchanger. The refrigerant is then directed out of the evaporator coil and may be re-compressed and re-cooled in the refrigeration circuit to be recycled through the evaporator coil.

Occasionally, water vapor from the conditioned space can be separated from the air and can condense on the evaporator coil, forming frost. To minimize the formation of frost on the evaporator coil and to remove frost from the evaporator coil, conventional temperature control apparatuses periodically operate in a defrost mode. In the defrost mode, hot gases are directed through the evaporator coil to heat the coil and melt any frost that may have accumulated on the coil. Alternatively, electric heating elements can be used to heat the air in the heat exchanger. To prevent unnecessary heating of the conditioned space, air is not directed through the heat exchanger during operation in the defrost mode. In defrost, airflow is typically restricted using a damper to close the discharge while the fans continue to operate.

SUMMARY OF THE INVENTION

According to the present invention, a transport temperature control apparatus operable in a cooling mode and a defrost mode includes a refrigeration circuit and a heat exchanger having an air inlet and an air outlet. The air inlet and the air outlet are in fluid communication with a conditioned space. An evaporator coil extends through the heat exchanger between the air inlet and the air outlet and is fluidly connected to the refrigeration circuit. A divider is positioned substantially perpendicular to the evaporator coil and defines a first portion of the evaporator coil and a second portion of the evaporator coil. A first fan is housed in the heat exchanger and is positioned adjacent the first portion of the evaporator coil. The first fan has a first operating condition for directing air across the evaporator coil in a first direction and a first non-operating condition. A second fan is housed in the heat exchanger and is positioned adjacent the second portion of the evaporator coil. The second fan has a second operating condition for directing air across the evaporator coil in a second direction and a second non-operating condition. The second direction is opposite the first direction.

In some embodiments, a damper is positioned in the air discharge for selectively preventing air from flowing through the air outlet and a heating element is positioned in the heat exchanger. The heating element can include an electric heater and/or a heating coil.

A controller is in electrical communication with the first fan and the second fan. The controller alternately operates the first fan in the first operating condition and the first non-operating condition and the second fan in the second operating condition and the second non-operating condition. The controller operates the first fan in the first operating condition for a first predetermined time and the second fan in the second non-operating condition for the predetermined time and then operates the second fan in the second operating condition for a second predetermined time and the first fan in the first non-operating condition for the second predetermined time. Also, the first and second fans alternately direct air in the first direction and the second direction.

The present invention also includes a method of conditioning air in a conditioned space with the transport temperature control apparatus. The method includes operating the temperature control apparatus in a cooling mode. The cooling mode includes directing air into the heat exchanger through the inlet with the first and second fans, transferring heat from the air to the evaporator coil and directing air out of the heat exchanger through the discharge with the first and second fans. The method also includes operating the temperature control apparatus in a defrost mode. The defrost mode includes activating the first fan and deactivating the second fan. The first fan directs air in a first direction across the first portion and then across the second portion. The defrost mode further includes activating the second fan and deactivating the first fan. The second fan directs air in a second direction across the second portion and then across the first portion. Additionally, the defrost mode includes heating air in the heat exchanger with a heating element positioned in the heat exchanger.

Additional features and advantages of the invention will become apparent to those skilled in the art upon consideration of the following detailed description, claims, and drawings.

BRIEF DESCRIPTION OF THE DRAWINGS

The present invention is further described with reference to the accompanying drawings, which show preferred embodiments of the present invention. However, it should be noted that the invention as disclosed in the accompanying drawings is illustrated by way of example only. The various elements and combinations of elements described below and illustrated in the drawings can be arranged and organized differently to result in embodiments which are still within the spirit and scope of the present invention.

In the drawings, wherein like reference numerals indicate like parts.

DETAILED DESCRIPTION

Figure 1:
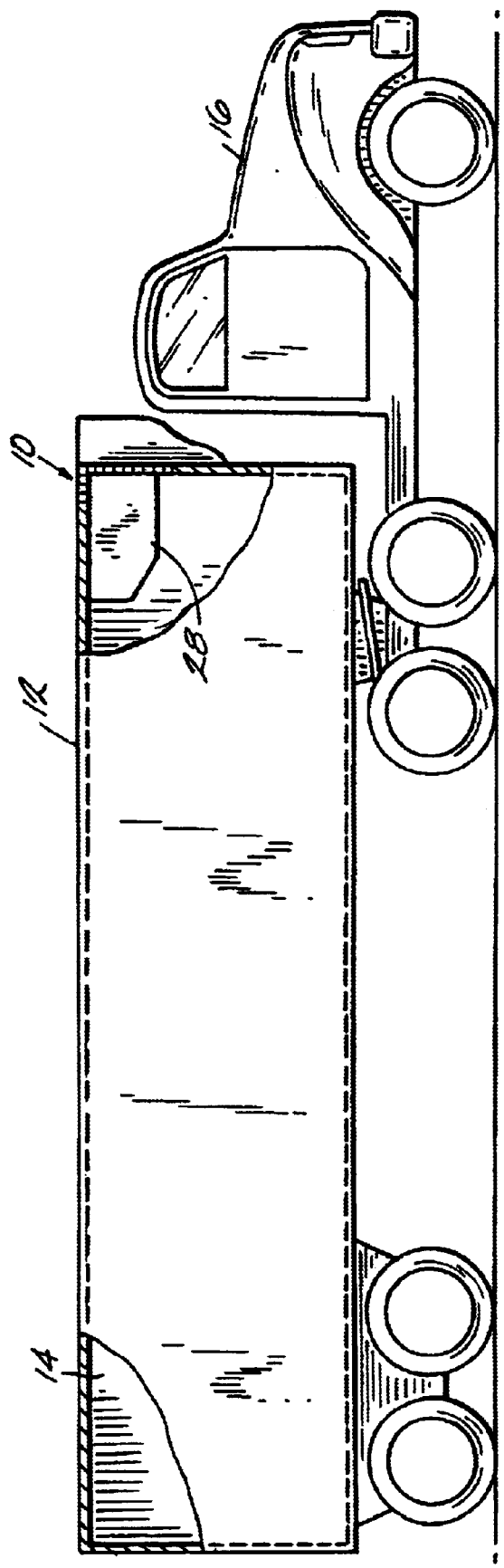
FIG. 1 is a side view, partially in section, of a vehicle having a temperature control apparatus embodying the present invention.

FIG. 1 illustrates a transportation temperature control apparatus 10 in accordance with the present invention. The temperature control apparatus 10 is mounted on a trailer 12 having a conditioned space 14. The trailer 12 is pulled by a tractor 16, as is understood by those skilled in the art. In other applications, the temperature control apparatus 10 can alternatively be used on other vehicles, such as a straight truck, a container, and the like. Similarly, the temperature control apparatus 10 can be used to control the temperature in the passenger space of a vehicle, such as for example, a bus or the passenger compartment of a truck.

As used herein and in the claims, the term "conditioned space" includes any space to be temperature and/or humidity controlled, including transport and stationary applications for the preservation of foods, beverages, plants, flowers, and other perishables, maintenance of a proper atmosphere for the shipment of industrial products, space conditioning for human comfort, and the like.

Additionally, as used herein and in the claims, the term "refrigerant" includes any conventional refrigerant including, but not limited to, a chloroflourocarbon (CFCs), hydrocarbons, cryogens (e.g., $CO_2$ and $N_2$), and other known refrigerants.

Figure 2:
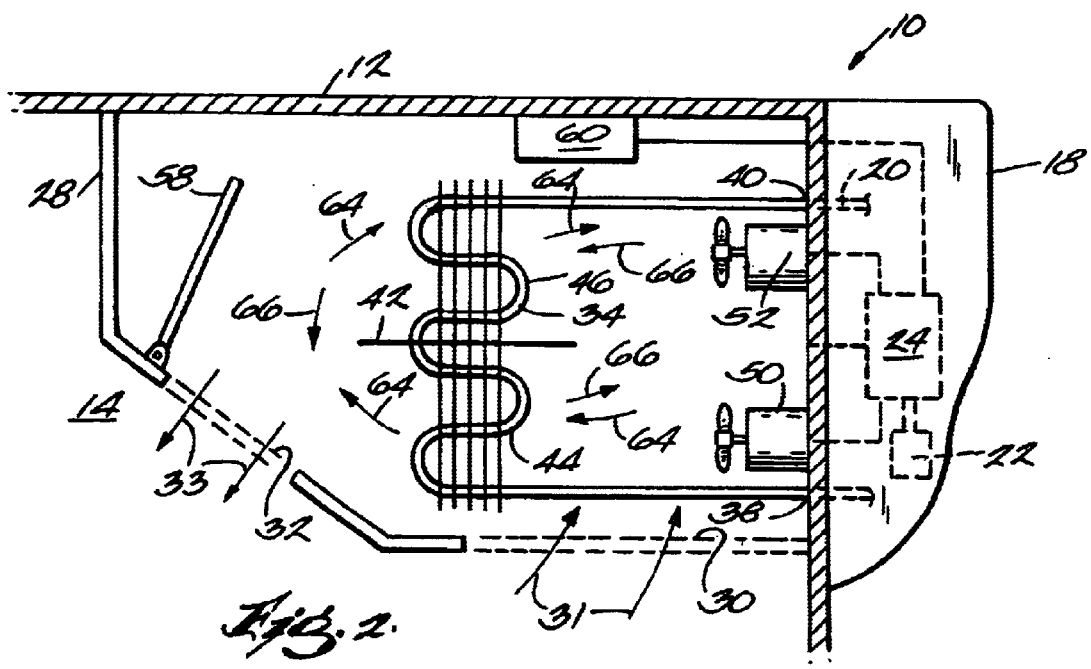
FIG. 2 is a side view of the temperature control apparatus according to a first embodiment of the present invention.

Referring now to FIG. 2, the refrigeration system 10 includes an outside housing 18, which is mounted outside the trailer 12. The outside housing 18 includes a refrigeration circuit 20 that can include a compressor (not shown) and a condenser (not shown), as is understood by those in the art. Alternatively, the refrigeration circuit 20 can include a storage tank (not shown) which houses a quantity of pressurized refrigerant, such as for example, a cryogen.

The outside housing 18 also includes a prime mover 22, such as for example, an electric generator, a fuel cell, a battery, an alternator, diesel engine, or the like. The prime mover 22 supplies power to the refrigeration system 10 and is electrically connected to a controller 24, such as for example a microprocessor, which controls operation of the temperature control unit 10. More specifically, based, at least in part, upon data received by sensors (not shown) distributed through the conditioned space 14, the temperature control unit 10, and outside the trailer 12, the controller 24 is programmed to shift between operation in cooling, defrost, and heating modes to maintain a set point temperature ("SP") in the conditioned space 14.

A heat exchanger 28 extends into the conditioned space 14 and includes an air inlet and an air outlet or discharge 32. Air enters the heat exchanger 28 (as illustrated in the figures by arrows 31) through the inlet 30 and travels across an evaporator coil 34 before being returned to the conditioned space 14 via the air outlet 32 (as illustrated in the figures by arrows 33). The evaporator coil 34 is fluidly connected to the refrigerant circuit 20 via an evaporator coil inlet 38 and an evaporator coil outlet 40. During operation in the cooling mode, cold liquid refrigerant is directed from of the refrigerant circuit 20 into the evaporator coil 34 via the evaporator coil inlet 38. The relatively warm conditioned space air warms the refrigerant, vaporizing the refrigerant. The vaporized or mostly vaporized refrigerant is then returned to the refrigerant circuit 20 to be recycled or alternatively is exhausted to the atmosphere. Simultaneously, the conditioned space air is cooled by contact with the relatively cool evaporator coil 32. The cooled air is then returned to the conditioned space 14 to maintain the desired set point temperature SP.

The evaporator coil 34 includes an evaporator coil divider 42, which extends across the evaporator coil 34, dividing the evaporator coil 34 into a first portion 44 and a second portion 46. A first fan or blower 50 is located in the heat exchanger 28 and is adjacent the first portion 44 of the evaporator coil 34. A second fan or blower 52 is located in the heat exchanger 28 adjacent the second portion 46 of the evaporator coil 34. The first and second fans 50, 52 are in electrical communication with and are controlled by the controller 24. In various embodiments, the first and second fans 50, 52 can be belt driven, electrically driven, clutch operated, or can be driven in any other conventional manner.

During operation in the cooling mode, the first and second fans 50, 52 blow air across the evaporator coil 34 and back into the conditioned space 14. Occasionally, during operation in the cooling mode, water vapor from the conditioned space 14 can be separated from the air and can condense on the evaporator coil 34, forming frost. To minimize the formation of frost on the evaporator coil 34 and to remove frost from the evaporator coil 34, the controller 24 is programmed to periodically operate the temperature control unit 10 in the defrost mode. The defrost mode can be initiated in any number of different manners. For example, the controller 24 can be programmed to initiate the defrost mode at timed intervals (e.g., every two hours). Also, the controller 24 can be programmed to initiate the defrost mode if sensors distributed throughout the temperature control apparatus 10 and the conditioned space 14 supply data to the controller 24 indicating that frost has accumulated on the evaporator coil 34 or that conditions are right for the formation of frost. Alternatively or in addition, an operator can manually initiate the defrost mode.

In the defrost mode, a damper 58 is closed preventing air from exiting the heat exchanger 28 through the air outlet 32. Additionally, a first valve (not shown) in the refrigeration circuit 20 is closed, preventing cold refrigerant from flowing into the evaporator coil 34. A second valve (not shown) is opened, causing a relatively warm fluid to flow through the evaporator coil 34. The second valve is fluidly connected to a heating circuit (not shown), which extends into the outside housing 18. In some applications, the heating circuit includes a heating element (not shown), such as for example a pan heater, which heats refrigerant from the refrigeration circuit 20 and then supplies the heated refrigerant to the evaporator coil 34 for heating and defrosting. In other applications, hot gas from the compressor (not shown) is directed through the heating circuit to the evaporator coil 34. In still other embodiments, other warm fluids, including but not limited to, antifreeze can be directed through a coil (not shown) adjacent to the evaporator coil 34.

As shown in FIG. 2, the heat exchanger 28 also includes an electric heater 60, which is in electrical communication with and is controlled by the controller 24. During operation in the heating and defrost modes, the heater 60 is turned on to heat the air in the heat exchanger 28.

Regardless of the source, the warm fluid enters the evaporator coil 34 through the evaporator coil inlet 38 and exits through the evaporator coil outlet 40. The warm refrigerant heats the evaporator coil 34, melting the frost formed on the exterior of the evaporator coil 34. However, the relatively cold evaporator coil 34 cools the warm fluid as the warm fluid flows through the evaporator coil 34 so that when the warm fluid exits the evaporator coil 34, the warm fluid is significantly cooler than it was at the evaporator coil inlet 38. Therefore, to ensure that the evaporator coil 34 is defrosted evenly and as rapidly as possible, the controller 34 is programmed to alternately activate and deactivate the first and second fans 50, 52. More particularly, when the defrost mode is initiated, the controller 24 shuts down the second fan 52 and continues to operate the first fan 50. In this manner, the first fan 50 blows air through the heat exchanger 28 along a first flow path 64 (represented by arrows 64) across the first portion 44 of the evaporator coil 34 and back across the second portion 46 of the evaporator coil 34. The controller 24 continues to operate the first fan 50 for a predetermined time period (e.g., two minutes). After the predetermined period of time, the controller 24 shuts down the first fan 50 and starts the second fan 52, directing air through the heat exchanger 28 along a second flow path 66 (represented by arrows 66). The second flow path 66 extends across the second portion 46 of the evaporator coil 34 and then across the first portion 44 of the evaporator coil 34. In this manner, the second fan 52 directs heat from the substantially defrosted first portion 44 onto the second portion 46, defrosting the second portion 52. At the same time, warm refrigerant is flowing through the second portion 46, further defrosting the second portion 52.

The first and second fans 50, 52 also force air across the heater 60 so that heat from the heater 60 is more evenly distributed throughout the heat exchanger 28 to defrost the evaporator coil 34. More specifically, when the first fan 50 is in operation, heated air from the heater 60 is directed along the first flow path 64 across the second portion 46 of the evaporator coil 34 and then across the first portion 44 of the evaporator coil 34. Similarly, when the second fan 52 is in operation, heat from the heater 60 is directed along the second flow path 66 across the first portion 44 and then across the second portion 46. Additionally, as mentioned above, the damper 58 is closed during operation in the defrost mode so that the heater 60 does not heat the conditioned space 14.

By periodically reversing the flow of air across the evaporator coil 34, the evaporator coil 34 is defrosted relatively evenly. More specifically, the evaporator coil inlet 38 and outlet 40 are defrosted at approximately the same rate. Additionally, because the first and second fans 50, 52 are alternately operated, rather than being operated simultaneously, the pressure inside the heat exchanger 28 rises relatively slowly. Conversely, in conventional heat exchangers 28, when two fans are in operation at the same time, the pressure inside the heat exchanger 28 rises at a much higher rate. Because the pressure inside and outside the heat exchanger 28 is relatively similar in the present invention, very little heated air leaks from the heat exchanger 28 into the conditioned space 14 through cracks and gaps in the heat exchanger housing. It is particularly desirable to prevent air from leaking out of the heat exchanger 28 during operation in the defrost mode because the relatively warm air in the heat exchanger 28 can heat the conditioned space air, thereby reducing the efficiency of the temperature control apparatus 10.

The controller 24 continues to cycle the first and second fans 50, 52 on and off as long as defrost is required. Once the controller 24 determines that defrost is no longer required or after the defrost mode times out, the controller 24 is programmed to close the second valve, stopping the flow of warm fluid into the evaporator coil 34. The controller 24 is also programmed to open the first valve, restoring the flow of refrigerant from the refrigeration circuit 20. Additionally, the controller 24 opens the damper 58 and shuts down the heater 60. The controller 24 then resumes operation in the cooling mode as required by load conditions and the ambient temperature.

Figure 3:
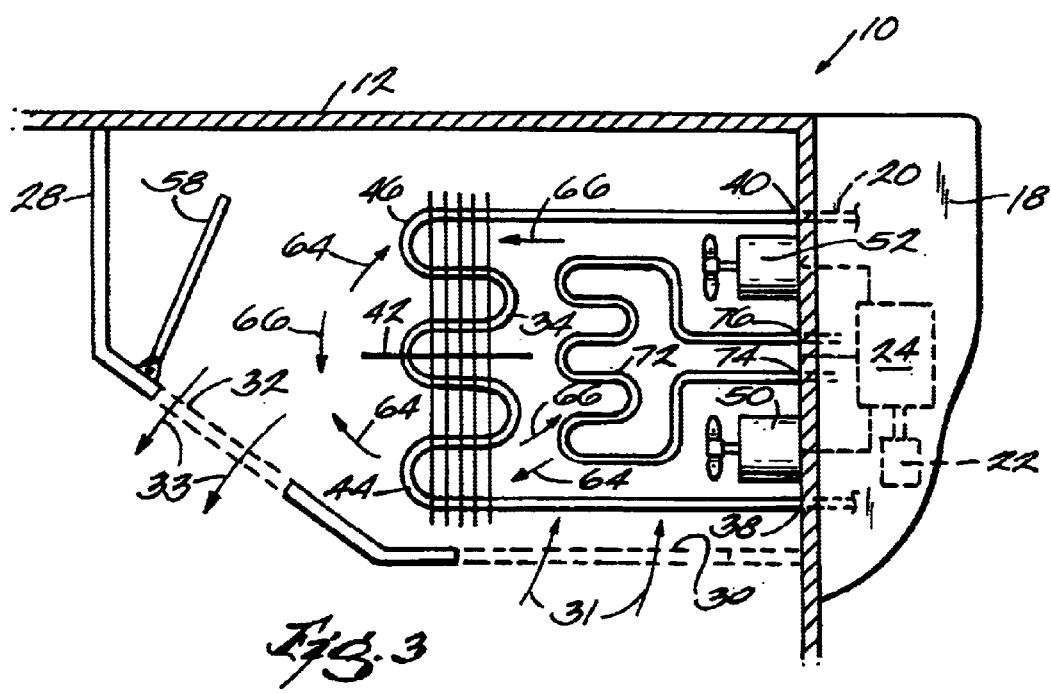
FIG. 3 is a side view of the temperature control apparatus according to a second embodiment of the present invention.

FIG. 3 shows a temperature control apparatus 10 according to a second embodiment of present invention, which is substantial similar to the previously described embodiment. For simplicity, like parts have been labeled with like reference numbers and only differences between the first and second embodiments will be described in detail hereafter.

In the second embodiment of the present invention, a heating coil 72 extends through the heat exchanger 28 between the first and second fans 50, 52 and the evaporator coil 34. However, in other applications, the evaporator coil 34 can be positioned between the first and second fans 50, 52 and the heating coil 72. The heating coil 72 is fluidly connected to the heating circuit. During operation in the defrost and heating modes, relatively warm fluid from the heating circuit enters the heating coil 72 through a heating coil inlet 74 and exits the heating coil 72 via a heating coil outlet 76.

In the second embodiment, when the defrost mode is initiated, the controller 24 shuts a valve (not shown) preventing refrigerant from entering the evaporator coil 34 and closes the damper 58 so that air does not leave the heat exchanger 28 via the air outlet 32. The controller 24 also opens a second valve (not shown) allowing warm fluid to enter the heating coil 72 via the heating coil inlet 74. The first and second fans 50, 52 are then cycled on and off for a predetermined time period as described above with respect to the previous embodiment. When the first fan 50 is on and the second fan 52 is off, air is directed along the first flow path 64. In the second embodiment, air traveling along the first flow path 64 is blown across the heating coil 72, the first portion 44 of the evaporator coil 34, the second portion 46 of the evaporator coil, and back across the heating coil 72. When the first fan 50 is off and the second fan 52 is on, air is directed along the second flow path 66. In the second embodiment, air traveling along the second flow path 64 is blown across the heating coil 72, the second portion 46 of the evaporator coil 34, the first portion 44 of the evaporator coil 34, and back across the heating coil 72.

When defrost is no longer required or when the defrost mode times out, the controller 24 shuts the second valve, preventing warm fluid from entering the heating coil 72. The controller 24 also opens the first valve, reconnecting the evaporator coil 34 to the refrigeration circuit 20 and opens the damper 58 so that air can exit the heat exchanger 28 through the air outlet 32.

Figure 4:
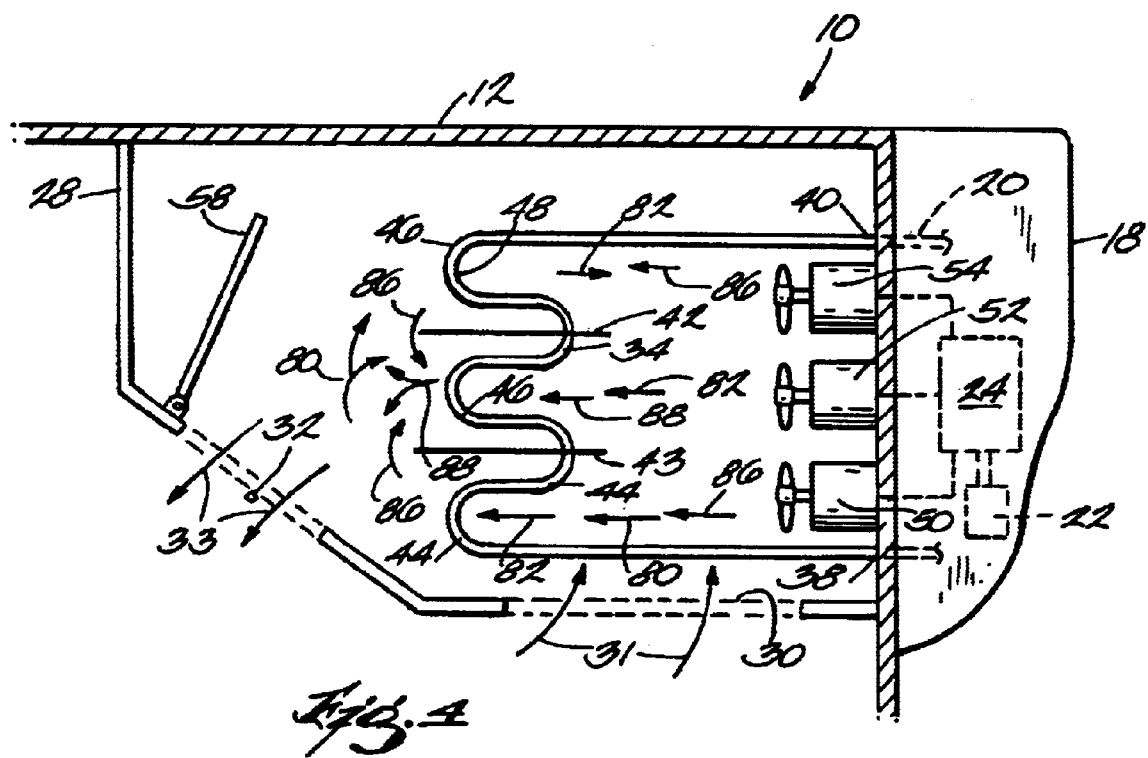
FIG. 4 is a side view of the temperature control apparatus according to a third embodiment of the present invention.

FIG. 4 shows a temperature control apparatus 10 according to a third embodiment of the present invention, which is substantial similar to the previously described embodiments. For simplicity, like parts have been labeled with like reference numbers and only differences between the third embodiments and the previous embodiments will be described in detail hereafter.

In the third embodiment of the present invention, a first divider 42 and a second divider 43 extend across the evaporator coil 34 dividing the evaporator coil 34 into a first portion 44, a second portion 46, and a third portion 48. The first fan or blower 50 is adjacent the first portion 44, the second fan or blower 52 is adjacent the second portion 46, and a third fan or blower 54 is adjacent the third portion 48.

During operation in the defrost mode, the damper 58 is closed, and the first valve is closed, preventing refrigerant from the refrigeration circuit 20 from entering the evaporator coil 34. Additionally, the second valve is opened to allow warm fluid from the heating circuit to enter the evaporator coil 34. The controller 24 then cycles the first, second, and third fans 50, 52, 54 on and off to move air through the heat exchanger 28 along at least two flow paths.

For example, the controller 24 can be programmed to activate the first fan 50 and deactivate the second and third fans 52, 54, directing air through the heat exchanger 28 along a first flow path 80 (represented by arrows). The first flow path 80 extends across the first portion 44 and back across the second and third portions 46, 48. The controller 24 can be programmed to activate the first and second fans 50, 52 and deactivate the third fan 54, directing air along a second flow path 82 (represented by arrows). The second flow path 82 extends across the first and second portions 44, 46 and back across the third portion 48. The controller 24 can be programmed to activate the first and third fans 50 and 54 and deactivate the second fan 52, directing air along a third flow path 84 (represented by arrows). The third flow path 86 extends across the first and third portions 44, 46 and then back across the second portion 46. The controller 24 can be programmed to activate the second fan 52 and deactivate the first and third fans 50, 54, directing air across along a fourth flow path 88 (represented by arrows). The fourth flow path 88 extends across the second portion 46 and back along the first and third portions 44, 48. One having ordinary skill in the art will appreciate that by alternately activating and deactivating the first, second, and third fans 50, 52, 54, the controller 24 can direct air along a number of other air flow paths, which for reasons of simplicity and brevity have not been described herein. Similarly, one having ordinary skill in the art will appreciate that the present invention can alternately include four, five, six or more fans with any number of air flow pathways.

When defrost is no longer required or when the defrost mode times out, the controller 24 shuts the second valve, preventing warm fluid from entering the evaporator coil 34. The controller 24 also opens the first valve, reconnecting the evaporator coil 34 to the refrigeration circuit 20 and opens the damper 58 so that air can exit the heat exchanger 28 through the air outlet 32. The controller 24 then activates the first, secondhand third fans 50, 52, 54 and begins operation in either the cooling mode or the heating mode.

Figure 5:
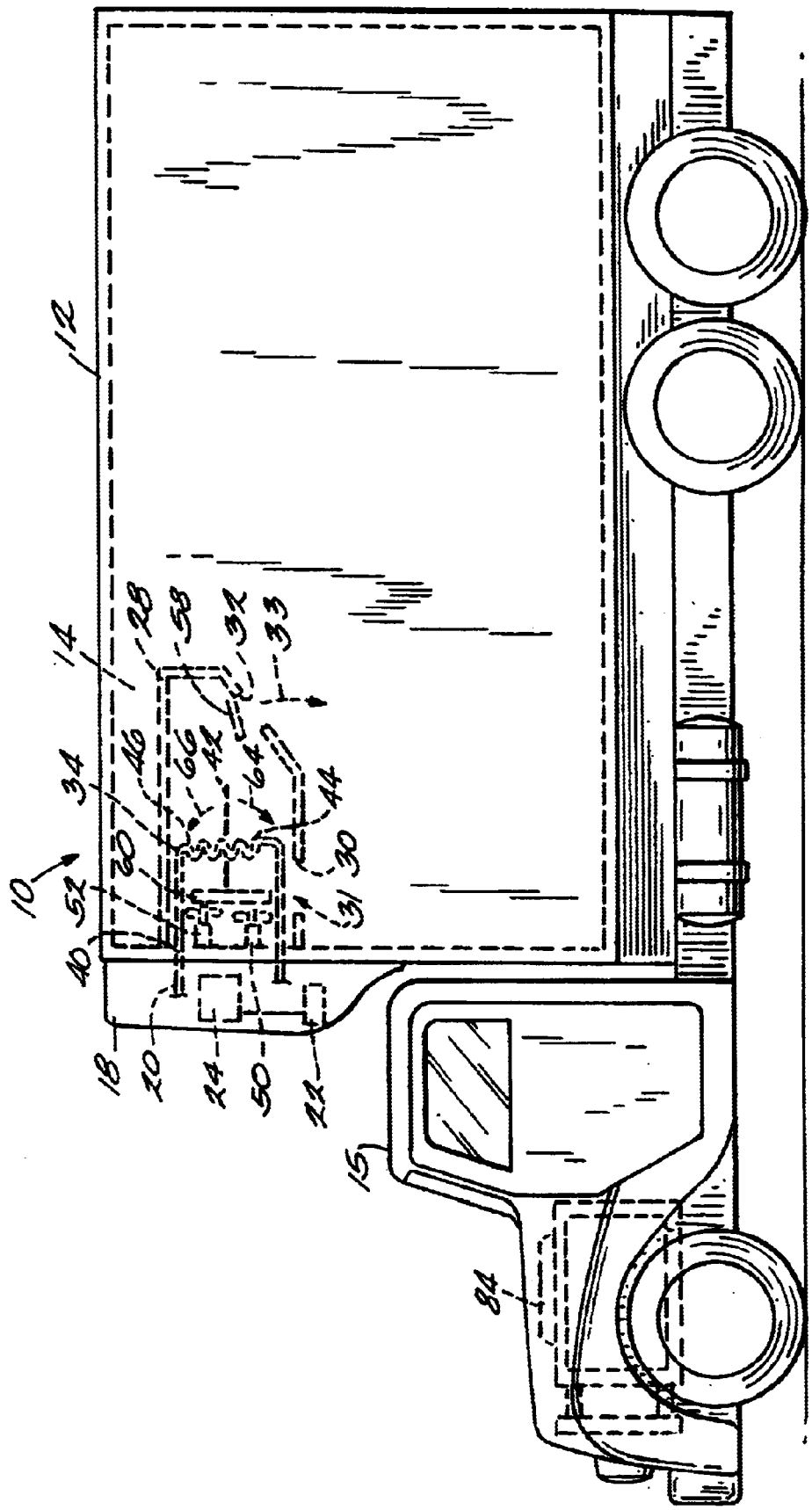
FIG. 5 is a left side view, partially in section, of a vehicle having a temperature control apparatus according to a fourth embodiment of the present invention.

FIG. 5 shows a temperature control apparatus 10 according to a fourth embodiment of present invention, which is substantial similar to the previously described embodiments. For simplicity, like parts have been labeled with like reference numbers and only differences between the fourth embodiment and the previous embodiments will be described in detail hereafter.

In the fourth embodiment, the temperature control apparatus 10 is mounted on a truck 15 having a conditioned space 14. A heater 60 is positioned in the heat exchanger 28 between the evaporator coil 34 and the first and second fans 50, 52. The heater 60 is an electric heater with an internal heating coil (not shown). Alternately, one having ordinary skill in the art will appreciate that in other embodiments the evaporator coil 34 can be positioned between the heater 60 and the first and second fans 50, 52. In still other embodiments, the heater 60 can be formed integrally with the evaporator coil 34. More specifically, the heater 60 can include electric heating coils (not shown) which extend between fins 80 located on the evaporator coil 34.

When the defrost mode is initiated, the controller 24 closes the damper 58, preventing air from exiting the heat exchanger 28 through the air outlet 32. Additionally, the first valve (not shown) in the refrigeration circuit 20 is closed, preventing cold refrigerant from flowing into the evaporator coil 34. A heating circuit 82 is in fluid communication with the truck's engine 84 and extends into the outside housing 18. The heating circuit includes a second valve (not shown). When heating or defrost is required, the second valve is opened, allowing hot antifreeze from the truck's engine 84 to enter the evaporator coil 34. The controller 24 cycles the first fans 50 on to move air through the heat exchanger 28 along the first air flow path 64, which extends across the first portion 44 and the second portion 46. After a predetermined time (e.g., two minutes), the controller 24 cycles the first fan 50 off and cycles the second fan 52. The second fan 52 directs air along the second air flow path 66, which extends across the second portion 46 and the first portion 44. In this manner, the heater 60 heats air in the heat exchanger 28, which in turn defrosts the evaporator coil 34. Simultaneously, the warm antifreeze flows through the evaporator coil 34, warming the evaporator coil 34 and melting any frost that has accumulated on the coil 34. After traveling through the evaporator coil 34, the antifreeze is returned to the truck's engine 84 via the heating circuit.

When defrost is no longer required or when the defrost mode times out, the controller 24 shuts the second valve, preventing antifreeze from entering the evaporator coil 34. Also, the controller 24 shuts down the heater 60 and directs the temperature control apparatus 10 to resume operation the cooling mode, as determined, at least in part, by the ambient temperature, the set point temperature SP, and the temperature of the conditioned space 14.

The embodiments described above and illustrated in the drawings are presented by way of example only and are not intended as a limitation upon the concepts and principles of the present invention. As such, it will be appreciated by one having ordinary skill in the art, that various changes in the elements and their configuration and arrangement are possible without departing from the spirit and scope of the present invention as set forth in the appended claims.

For example, the present invention is described herein as being used in a trailer 12 having a single conditioned space 14. However, one having ordinary skill in the art will appreciate that the present invention could also be used in trucks or trailers having multiple conditioned spaces 14.

As such, the functions of the various elements and assemblies of the present invention can be changed to a significant degree without departing from the spirit and scope of the present invention.

What is claimed is:

1. A transport temperature control apparatus operable in a cooling mode and a defrost mode, the apparatus comprising:
   a refrigeration circuit;
   a heat exchanger having an air inlet and an air outlet, the air inlet and the air outlet being in fluid communication with a conditioned space;
   an evaporator coil extending through the heat exchanger between the air inlet and the air outlet and being fluidly connected to the refrigeration circuit;
   a divider substantially perpendicular to the evaporator coil, the divider defining a first portion of the evaporator coil and a second portion of the evaporator coil;
   a first fan housed in the heat exchanger and being positioned adjacent the first portion of the evaporator coil, the first fan having a first operating condition for directing air across the evaporator coil in a first direction and a first non-operating condition; and a second fan housed in the heat exchanger and being positioned adjacent the second portion of the evaporator coil, the second fan having a second operating condition for directing air across the evaporator coil in a second direction and a second non-operating condition, the second direction being opposite the first direction.

2. The transport temperature control apparatus of claim 1, further comprising a damper positioned in the air discharge for selectively preventing air from flowing through the air outlet.

3. The transport temperature control apparatus of claim 1, further comprising a heating element positioned in the heat exchanger.

4. The transport temperature control apparatus of claim 3, wherein the heating element is an electric heater.

5. The transport temperature control apparatus of claim 3, wherein the heating element is a heating coil.

6. The transport temperature control apparatus of claim 1, further comprising a controller in electrical communication with the first fan and the second fan, the controller alternately operating the first fan in the first operating condition and the first non-operating condition and the second fan in the second operating condition and the second non-operating condition.

7. The transport temperature control apparatus of claim 6, wherein the controller operates the first fan in the first operating condition for a first predetermined time and the second fan in the second non-operating condition for the predetermined time and then operates the second fan in the second operating condition for a second predetermined time and the first fan in the first non-operating condition for the second predetermined time.

8. The transport temperature control apparatus of claim 1, wherein the first and second fans alternately direct air in the first direction and the second direction.

9. The transport temperature control apparatus of claim 1, further comprising a first flow path and a second flow path, the first flow path extending from the first fan to the first portion of the evaporator coil and then across the second portion of the evaporator coil, the second flow path extending from the second fan to the second portion of the evaporator coil and then across the first portion of the evaporator coil, and wherein in the first operating condition the first fan directs air along the first flow path and in the second operating condition the second fan directs air along the second flow path.

10. The transport temperature control apparatus of claim 1, further comprising:

a second divider coupled to the evaporator coil and being substantially parallel to the first divider, the first and second dividers defining the second portion of the evaporator coil and the second divider defining a third section of the evaporator coil; and a third fan housed in the heat exchanger and being positioned adjacent the third portion of the evaporator coil, the third fan having a third operating condition for directing air across the evaporator coil and a third non-operating condition.

11. A method of conditioning air in a conditioned space with a transport temperature control apparatus, the temperature control apparatus including a heat exchanger having an air inlet and an air discharge, an evaporator coil extending through the heat exchanger between the air inlet and the air discharge, a divider coupled to the evaporator coil and defining a first portion of the evaporator coil and a second portion of the evaporator coil, a first fan adjacent the first portion, and a second fan adjacent the second portion, the method comprising:

operating the temperature control apparatus in a cooling mode, the cooling mode including:
directing air into the heat exchanger through the inlet with the first fan and the second fan;
transferring heat from the air to the evaporator coil; and
directing air out of the heat exchanger through the discharge with the first fan and the second fan; and operating the temperature control apparatus in a defrost mode, the defrost mode including:
activating the first fan and deactivating the second fan, the first fan directing air in a first direction across the first portion and then across the second portion;
activating the second fan and deactivating the first fan, the second fan directing air in a second direction across the first portion and then across the second portion, the second direction being opposite the first direction; and
heating air in the heat exchanger with a heating element positioned in the heat exchanger.

12. The method of claim 11, wherein the temperature control apparatus includes a damper positioned in the air discharge, the damper having an open position and a closed position, the method further comprising moving the damper to the closed position during operation in the defrost mode.

13. The method of claim 11, wherein the heating element is an electric heater.

14. The method of claim 11, wherein the heating element is a heating coil.

15. The method of claim 11, wherein the temperature control apparatus includes a controller in electrical communication with the first fan and the second fan, the controller alternately operating the temperature control apparatus in the defrost mode and the cooling mode.

16. The method of claim 15, wherein the controller activates the first fan for a first predetermined time and deactivates the second fan for the predetermined time and then activates the second fan for a second predetermined time and deactivates the first fan for the second predetermined time.

17. The transport temperature control apparatus of claim 1, wherein the temperature control apparatus includes a second divider coupled to the evaporator coil and being substantially parallel to the first divider, the first and second dividers defining the second portion of the evaporator coil and the second divider defining a third section of the evaporator coil and a third fan housed in the heat exchanger and being positioned adjacent the third portion of the evaporator coil, and wherein operating in the defrost mode includes alternately cycling the third fan on and off.

18. A method of conditioning air in a conditioned space with a temperature control apparatus, the temperature control apparatus including a heat exchanger having an inlet and an outlet, an evaporator coil extending through the heat exchanger between the inlet and the outlet, a divider coupled to the evaporator coil and defining a first portion of the evaporator coil and a second portion of the evaporator coil, a first fan adjacent the first portion, and a second fan adjacent the second portion, the method comprising:

initiating a defrost mode;
heating air in the heat exchanger;
preventing air from exiting the air outlet;

activating the first fan;

deactivating the second fan blowing air with the first fan along a first flow path, the first flow path extending across the first portion and then across the second portion;

deactivating the first fan;

activating the second fan; and blowing air with the second fan along a second flow path, the second flow path extending across the second portion and then across the first portion.

19. The method of claim 18, wherein the temperature control apparatus includes a damper positioned adjacent the discharge and wherein preventing air from exiting the air outlet includes closing the outlet with the damper.

20. The method of claim 18, wherein the temperature control apparatus includes a heating element and wherein heating air in the heat exchanger includes blowing air across the heating element.

21. The method of claim 18, wherein heating air in the heat exchanger includes directing a warm fluid through the evaporator coil.

* * * * *